United States Patent
Okamoto et al.

(10) Patent No.: US 9,349,298 B2
(45) Date of Patent: May 24, 2016

(54) SYSTEM AND METHOD FOR ON-LINE INTERACTIVE LEARNING AND FEEDBACK

(71) Applicant: ApprenNet, Inc., Wyndmoor, PA (US)

(72) Inventors: Karl Shumpei Okamoto, Wyndmoor, PA (US); Emily Christian Foote, Philadelphia, PA (US); Yuhan Paul Tzen, Philadelphia, PA (US)

(73) Assignee: ApprenNet, Inc., Wyndmoor, PA (US)

( * ) Notice: Subject to any disclaimer, the term of this patent is extended or adjusted under 35 U.S.C. 154(b) by 149 days.

(21) Appl. No.: 13/951,691

(22) Filed: Jul. 26, 2013

(65) Prior Publication Data

US 2014/0057238 A1    Feb. 27, 2014

Related U.S. Application Data

(60) Provisional application No. 61/691,850, filed on Aug. 22, 2012.

(51) Int. Cl.
| | |
|---|---|
| G09B 3/00 | (2006.01) |
| G09B 5/06 | (2006.01) |
| G06Q 50/20 | (2012.01) |
| G09B 7/00 | (2006.01) |
| G06F 17/30 | (2006.01) |
| G09B 7/02 | (2006.01) |
| H04N 1/00 | (2006.01) |
| G09B 5/00 | (2006.01) |

(52) U.S. Cl.
CPC .............. *G09B 5/06* (2013.01); *G06F 17/3053* (2013.01); *G06Q 50/20* (2013.01); *G06F 17/3064* (2013.01); *G06F 17/3089* (2013.01); *G09B 5/00* (2013.01); *G09B 7/00* (2013.01); *G09B 7/02* (2013.01); *H04N 1/00132* (2013.01)

(58) Field of Classification Search
CPC ............ H04N 1/00132; G06F 17/3089; G06F 17/3053; G06F 17/3064; G06Q 50/20; G09B 5/00; G09B 7/00; G09B 7/02; G09B 5/06
USPC .......................... 434/322; 705/26.7; 707/748
See application file for complete search history.

(56) References Cited

U.S. PATENT DOCUMENTS

| | | | |
|---|---|---|---|
| 8,108,255 B1 * | 1/2012 | Robinson et al. .......... 705/14.44 |
| 8,666,961 B1 * | 3/2014 | Qureshi ............ G06F 17/30312 |
| | | | 707/705 |
| 2007/0271502 A1 * | 11/2007 | Bedi et al. ...................... 715/512 |
| 2009/0048860 A1 * | 2/2009 | Brotman et al. .................. 705/1 |
| 2009/0287619 A1 * | 11/2009 | Liang et al. ..................... 706/11 |

* cited by examiner

*Primary Examiner* — Jack Yip
(74) *Attorney, Agent, or Firm* — Baker & Hostetler LLP

(57) ABSTRACT

A system and method for on-line interactive learning and feedback is provided. The system elicits user responses and provides a means for the users to evaluate responses and receive feedback from other users and from subject matter experts.

33 Claims, 15 Drawing Sheets

1. Watch and respond

2. Give and get feedback

Feedback is currently closed

Top Responses

Your position: Total submissions: 158

| 1 | Philip Bonini | View |
| 2 | Paul Urbish | View |
| 3 | Kathryn Brown | View |
| 4 | Eric Sando | View |
| 5 | Christian Clifford | View |

*FIG. 13*

Participant comments on Hannah Eather's Submission

 Katie Swanson commented     04/07/2013 11:57 pm

Good detail on Jessica Smith's Submission

 Katie Swanson commented     04/07/2013 11:57 pm very upbeat on Lexie Grizzle's Submission

 Katie Swanson commented     04/07/2013 11:56 pm good eye contact on joElle Griffin's Submission

 Katie Swanson commented     04/07/2013 11:56 pm

After it burned on Marissa Cocreham's Submission

 Katie Swanson commented     04/07/2013 11:54 pm

Good eye contact on Linda Rutherford's Submission

 Katie Swanson commented     04/07/2013 11:54 pm

Very clear and unbeat on Marissa Cocreham's Submission

*FIG. 14*

SYSTEM AND METHOD FOR ON-LINE INTERACTIVE LEARNING AND FEEDBACK

CROSS REFERENCE TO RELATED APPLICATIONS

This application claims priority to U.S. Provisional Application No. 61/691,850, filed on Aug. 22, 2012, entitled "System and Method for On-line Interactive Learning and Feedback," the entirety of which is incorporated herein by reference.

TECHNICAL FIELD

The present invention pertains to systems and methods for on-line learning and feedback.

BACKGROUND

In a standard classroom setting, an instructor conveys information to a group of learners in the form of a lecture. The lecture is typically interspersed with discrete opportunities for learners to engage with the instructor and their classmates. Because the ratio of learners to instructors is often large, it is impractical for the instructor to actively engage each learner during each session. Many learners, therefore, miss valuable opportunities to process the material and interact with their instructors and peers.

Opportunities to actively engage are especially important when the instructor is imparting practical, real-life skills. One model for teaching such practical skills is an apprenticeship where the instructor focuses his or her attention on a single learner. However, apprenticeships are not always an option for every learner because they are expensive and time-consuming. Additionally, learners in apprentice-style relationships miss out on opportunities to engage with and learn from their peers. There is currently a need for an instructional method which combines the active, individualized engagement of an apprenticeship with the peer-learning opportunities of a typical classroom setting.

SUMMARY

There is provided a system and method whereby a server aids a user, such as a learner, in interactively engaging with instructional materials and providing and receiving feedback. The server communicates with a user Internet enabled device so as to provide the user thereof with an assignment, or "challenge," created by an author as part of a learning exercise. The user then actively engages with the material by researching an answer and providing a response to the server. The server then searches for responses submitted by other users participating in the exercise, and the server provides the user with a set number of these responses in a particular configuration as pre-determined by the software associated with the server. Interactively with the server, the user evaluates the responses, for example by ranking responses and/or submitting constructive written feedback. This evaluation step allows the learner to actively engage with other learners, and the ranking system encourages the learner to submit competitive, high-quality responses. The server analyzes the evaluations submitted by all of the users and, employing an algorithm, generates a list of top-ranked user responses, which is presented on the website in the form of a "leaderboard."

These responses may optionally be reviewed by an expert who provides the users, via the server, with feedback and/or model responses. All learners have access to the expert responses, and thus benefit indirectly from the expert's feedback. Focusing the expert's attention on only the top-rated responses makes efficient use of the expert's time and allows for a highly scalable number of learners at minimum cost. Experts also reserve the option to review submissions other than the top-ranked responses. The system and method may also optionally include a plurality of customizable templates to assist in the generation of new exercises as well as additional methods of peer-to-peer engagement such as a document collaboration tool, conference features and question and answer simulation.

BRIEF DESCRIPTION OF THE DRAWINGS

FIG. 13 is a screen shot of an exemplary web page of a website showing the top-ranked responses in the form of a leaderboard.

FIG. 14 is a screen shot of an exemplary web page of a website displaying expert-generated evaluations of the top-ranked responses on the leaderboard.

DETAILED DESCRIPTION OF ILLUSTRATIVE EMBODIMENTS

Figure 1:
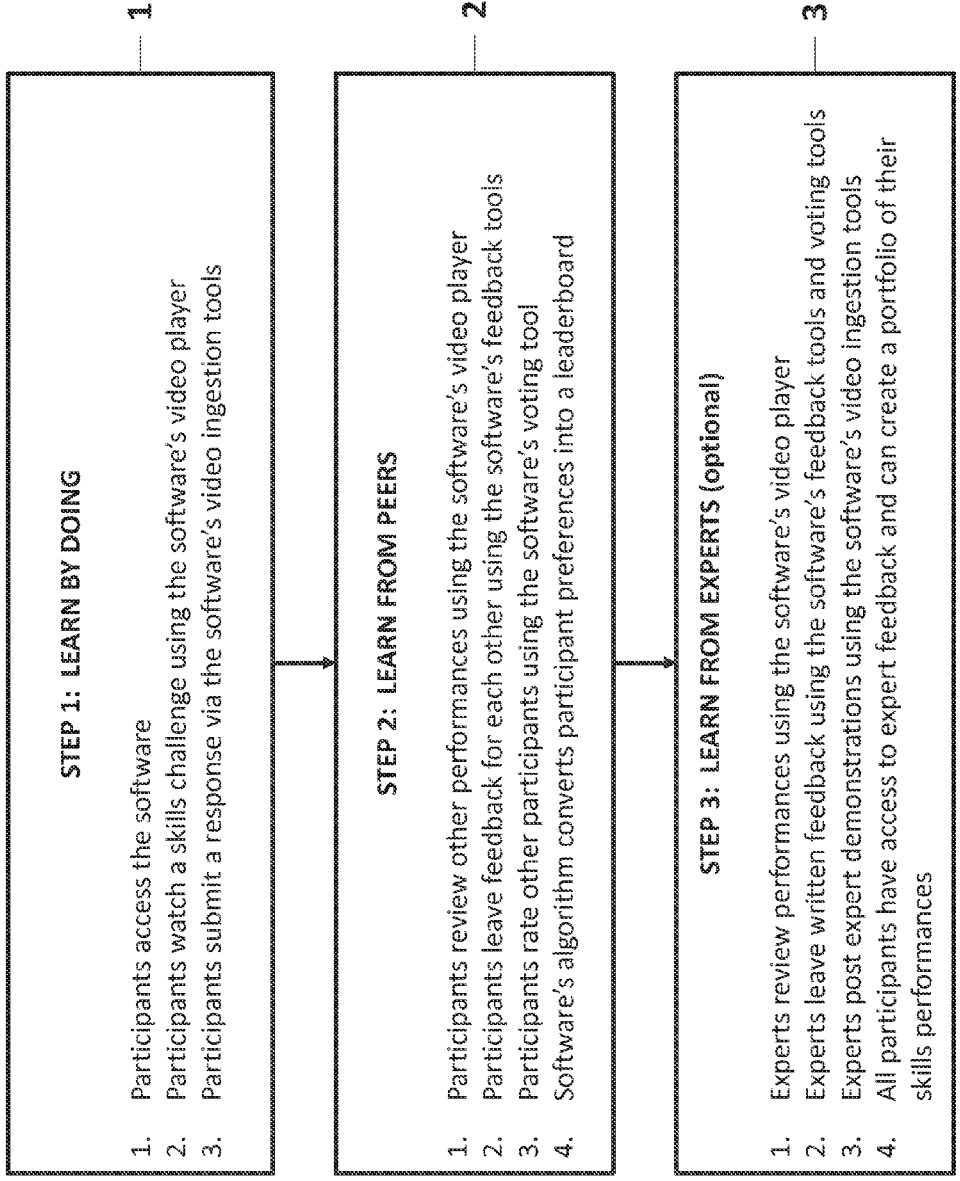
FIG. 1 is a flow chart illustrating an exemplary embodiment of a method for on-line interactive learning and feedback.

As used in this description, "user" includes but is not limited to a student, an employee, a member of an organization, and the like. A Meet is the term presently used for the commercial embodiment of the method and system described and claimed herein and as presently implemented at http://www.ApprenNet.com ("Meet website"). Initially, the Meet commercial embodiment targeted law students and law professors. A LawMeet® is the term used for a commercial embodiment of the method and system described and claimed herein as used in the legal education context and implemented at http://www.lawmeets.com. Presently, the Meet commercial embodiment includes a number of non-legal instructional settings, including, but not limited to, nursing education, as well as the service industry. Meets may be used in a wide variety of instructional settings including corporate training.

Specifically, a Meet is a two or three step learning exercise involving learning by doing, learning from peers and optionally learning from experts. The term "author" refers to the persons or entities responsible for creating a Meet and making it available to users. Authors are the primary client in the use of the invention. In the context of a Meet in its initial commercial embodiment, an author might be a professor who offers his or her students an exercise as part of a course. Other examples of authors include a director who offers an exercise using the invention as part of an in-house professional development program, an employer who offers an exercise as part of a skills training seminar, and the like. The term "expert" refers to the persons or entities that have expertise in the subject matter of the exercise. Examples of experts include senior lawyers (as in a LawMeet®), company managers, experienced employees, and the like.

The three user interfaces described in this system are the "author interface," the "novice interface," and the "expert interface." The author interface allows authors to select the exercise to be offered, determine the timeline, determine the identity of permitted participants, access the results, and the like. The novice interface presents registered users with a menu of available exercises, provides a voting device that, in one embodiment, presents users with randomly selected pairs of stored videos and allows them to select a preference, provides a means for submitting written commentary on the videos they view, provides a means for viewing the videos listed on the leaderboard and any associated commentary, provides the commerce interface to allow users to make any required payments, and links to an enhanced portfolio building tool. The expert interface offers a single point of entry to the platform for all experts. It allows experts to access the judging and feedback functions and it provides tools to develop a profile, to record and present their expert demonstrations and feedback on the site, and the like. All user interfaces may allow access to Continuing Legal Education programs and may additionally have enhanced social networking features allowing users to better communicate with each other through the site.

Referring to the drawings, where like numerals represent like elements, there is illustrated an exemplary system and method for on-line interactive learning and feedback, which, in the exemplary embodiment, is carried out via either a website or an application on an Internet enabled device, such as a smart phone, tablet or a computer that runs applications, e.g., a computer running Windows 8 applications.

FIG. 1 illustrates, at a high level, an exemplary embodiment of the claimed method. The illustrated method for interactive on-line learning and feedback involves two or three steps wherein the user first actively engages with the material by performing a task in response to a skills challenge (step 1) and then learns from his or her peers by reviewing performances and leaving feedback (step 2). The server compiles all of the user-generated reviews and uses an algorithm to create a list of top-ranked responses, otherwise referred to as a "leaderboard" (step 2). Optionally, the user may learn from experts, who review the top-ranked responses, provide feedback and/or post a model response (step 3).

Figure 2:
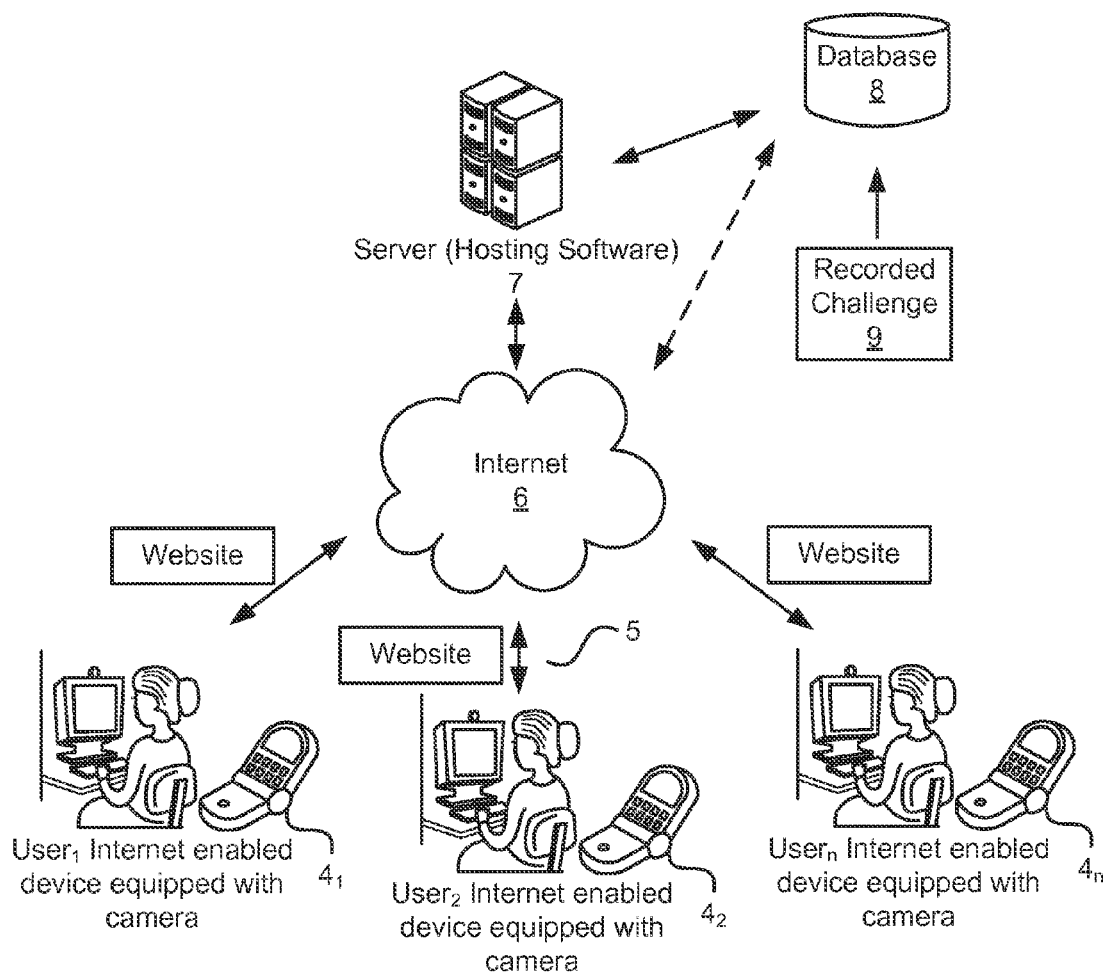
FIG. 2 illustrates hardware and network details of an exemplary system for carrying out the methods shown and described herein.

FIG. 2 illustrates an exemplary network-based system that may be employed to carry out the invention. The system comprises a server 7 that hosts software and carries out the functionality described herein, and one or more Internet enabled devices $4_1 \ldots 4_n$, such as a computer or mobile device that function as a client. The software hosted on the server 7 includes one or more media players or similar software services which are accessed by the user via the Internet through the website. The Internet enabled device $4_1 \ldots 4_n$ preferably is able to play and record video (aka a webcam). This may include mobile devices such as smartphones and tablets that come with embedded Internet access and video capabilities. A website 5 is hosted by the server and offers basic login functions, a streaming video interface, a video file upload tool with back-end video encoding, storage and playback capabilities, a voting device that presents users with randomly selected pairs or multiples of stored videos and allows them to select a preference, a scoring algorithm and a leaderboard. In addition to voting, a user interface allows users to provide written comments on the videos they view, to view videos listed on the leaderboard and any associated commentary, and to access a portfolio of their own videos and comments.

Database 8 stores information retrieved from, and/or pushed to the database by the server 7. Database 8 may be remote from the server 7, and communicate therewith via the Internet 6 (as shown by the dashed line) or other network, or it may be resident with or local to the server 7. The information in database 8 may be obtained by means of FTP data feeds, real-time HTTP requests, and/or crawling systems. Information concerning author-generated exercises in the form of a "challenge" 9, media file responses, rankings, expert demonstrations, etc. is stored in the database 8. Preferably, server 7 regularly updates this information in real-time, on a periodic schedule, or as a batch process. Server 7 preferably sorts the information in a manner that enables efficient searching in response to requests for information from the user.

A user who wishes to participate in a Meet accesses the server 7 via the Internet 6 using his or her Internet enable device $4_1 \ldots 4_n$ by entering the URL of the server 7, for example, via a browser. At his or her device $4_1 \ldots 4_n$, the user may input information relating to the Meet, via on-line forms provided by the server 7. The user may also provide personal information for the purpose of generating a user account or paying for a subscription to the system. The server 7 responds to a user-generated request for information by searching the database 8 for recorded challenges 9 or other information, and relays this information to the user device $4_1 \ldots 4_n$ via the website 5. The user generates a response to the challenge, for example by recording a video using the webcam on his or her device, and sends this response, for example in the form of a video file, to the server 7. The server stores the responses of all users in the database 7. The server communicates with the devices $4_1 \ldots 4_n$ by sending stored responses in pre-determined configurations, and allowing the user to provide feedback on the responses, for example by ranking responses and providing written commentary. The server 7 stores this feedback on the database 8 and then performs various tasks with relation to the stored feedback, for example by generating a leaderboard of top-ranked responses and posting the leaderboard and associated feedback on the website 5.

Figure 3:
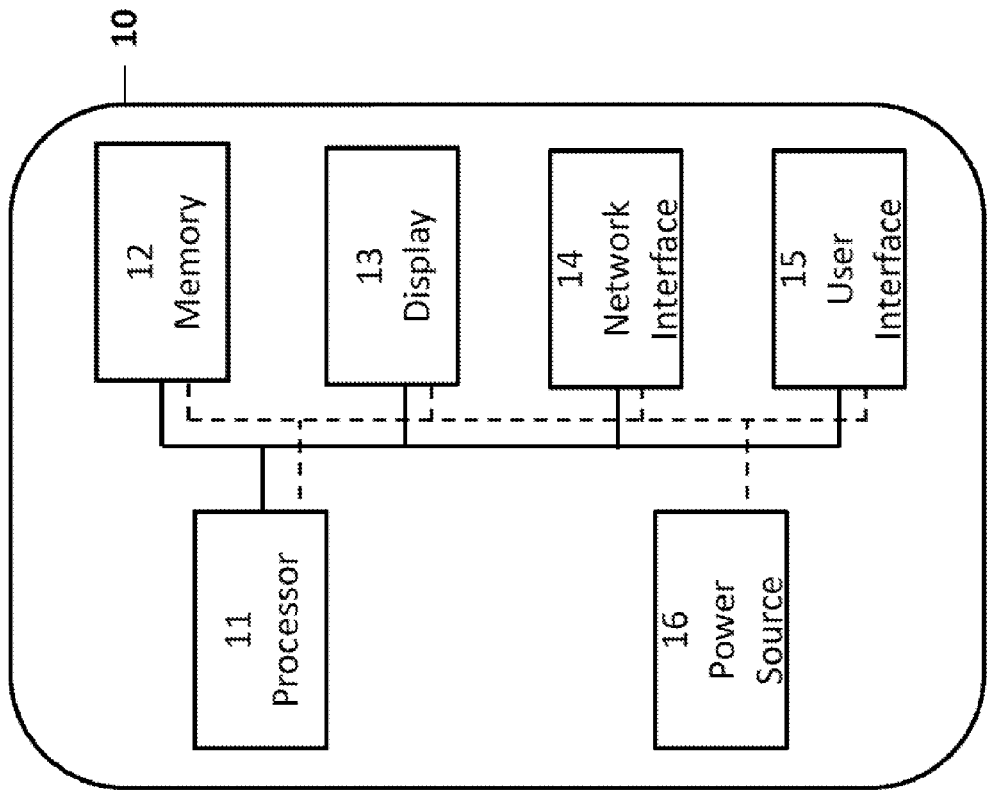
FIG. 3 illustrates exemplary hardware details of a client-side Internet enabled device that may be used in connection with the present invention.

FIG. 3 depicts exemplary hardware details of device 10. Device 10 may be a computer, such as a desktop computer or laptop computer, a tablet Internet enabled device, a cell phone, a handheld Internet enabled device or any other type of Internet enabled device. As is common, the device may include a processor 11 that is able to execute instructions stored in one or more memories 12. Processor 11 may generate information on a display component 13. Display component 13 may include a display driver, a display card, or any other hardware and/or software required to display an image or series of images. The device 10 may also include a network interface 14 that allows the device to send and receive information signals via a network. Network interface 14 may include any type of network adapter for connecting to a network, such as an adapter to establish a connection to the Internet, to a wired or wireless intranet, to a cellular network or to a wireless network. Device 10 may also include a user interface 15. User interface 15 may include one or more external components, such as an external keyboard, external mouse, external microphone, external speaker, and the like. Device 10 may include at least one power source 16. Power source 16 may provide power to any or all of the other components in Internet enabled device 10. Power source 16 may be connected to, and provide power to, each of processor 11, memory 12, display 13, network interface 14 and user interface 15. Power source 16 may be any type of power source, such as one or more disposable batteries, a rechargeable battery and the like.

Figure 4:
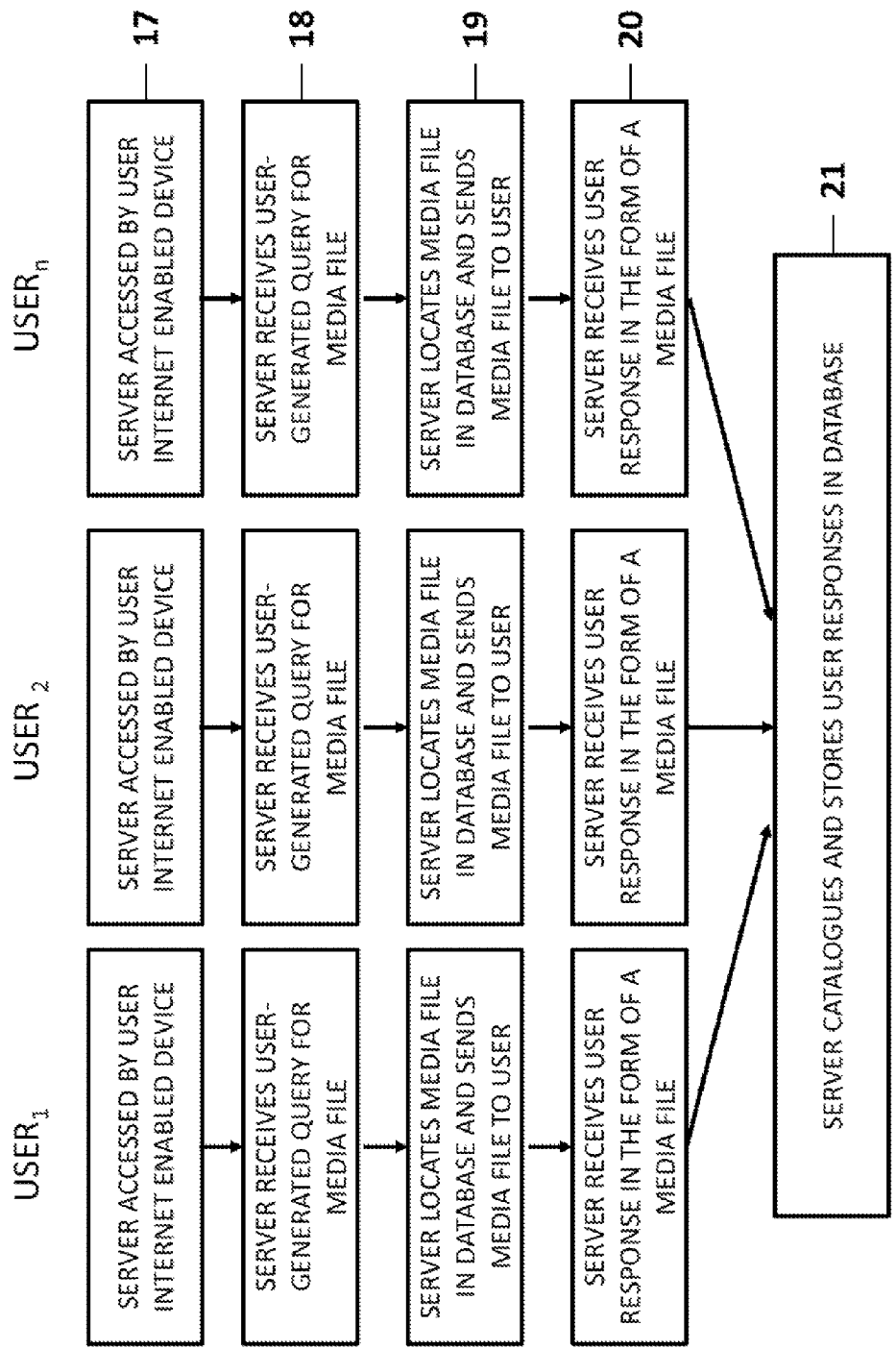
FIG. 4 illustrates an exemplary method by which users access an exercise and submit a response.
Figure 10:
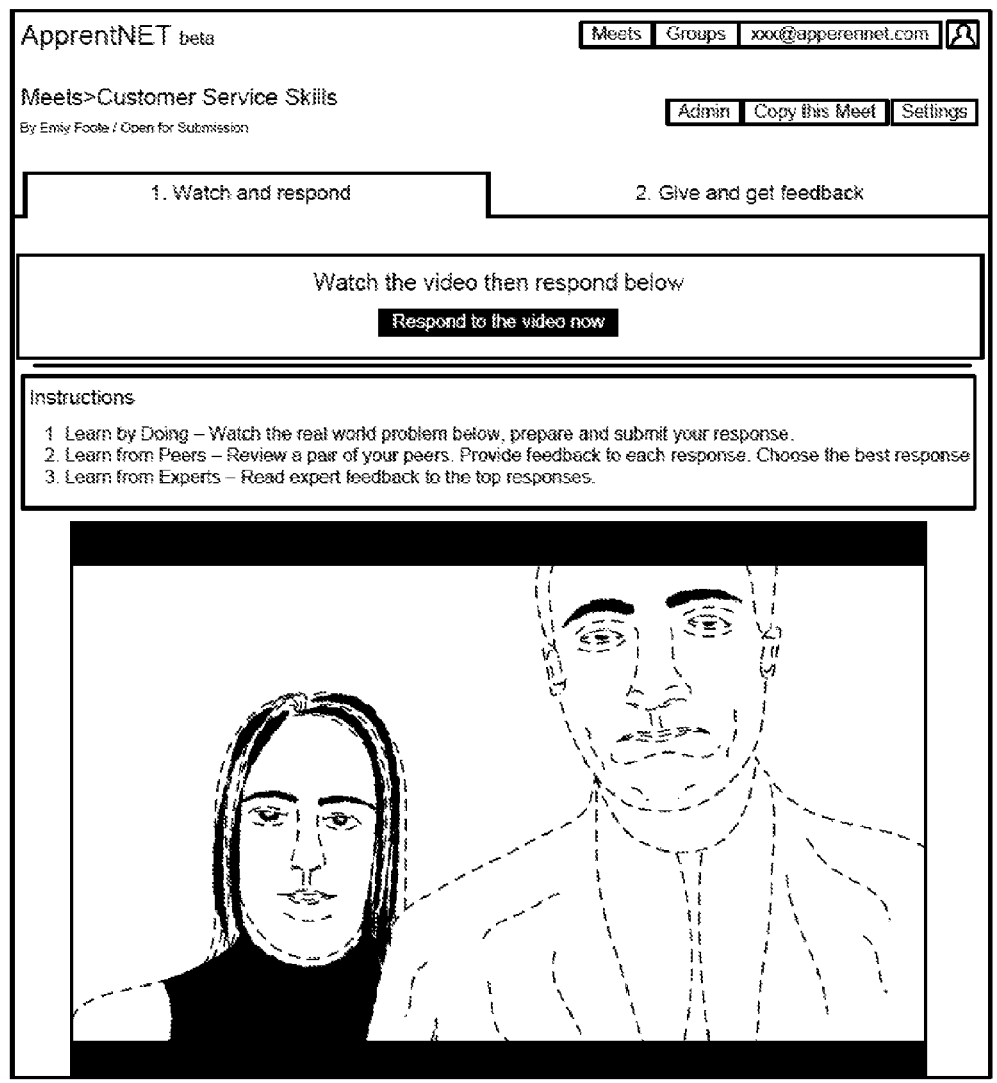
FIG. 10 is a screen shot of an exemplary web page of a website showing an exercise challenge in the form of a video.
Figure 11:
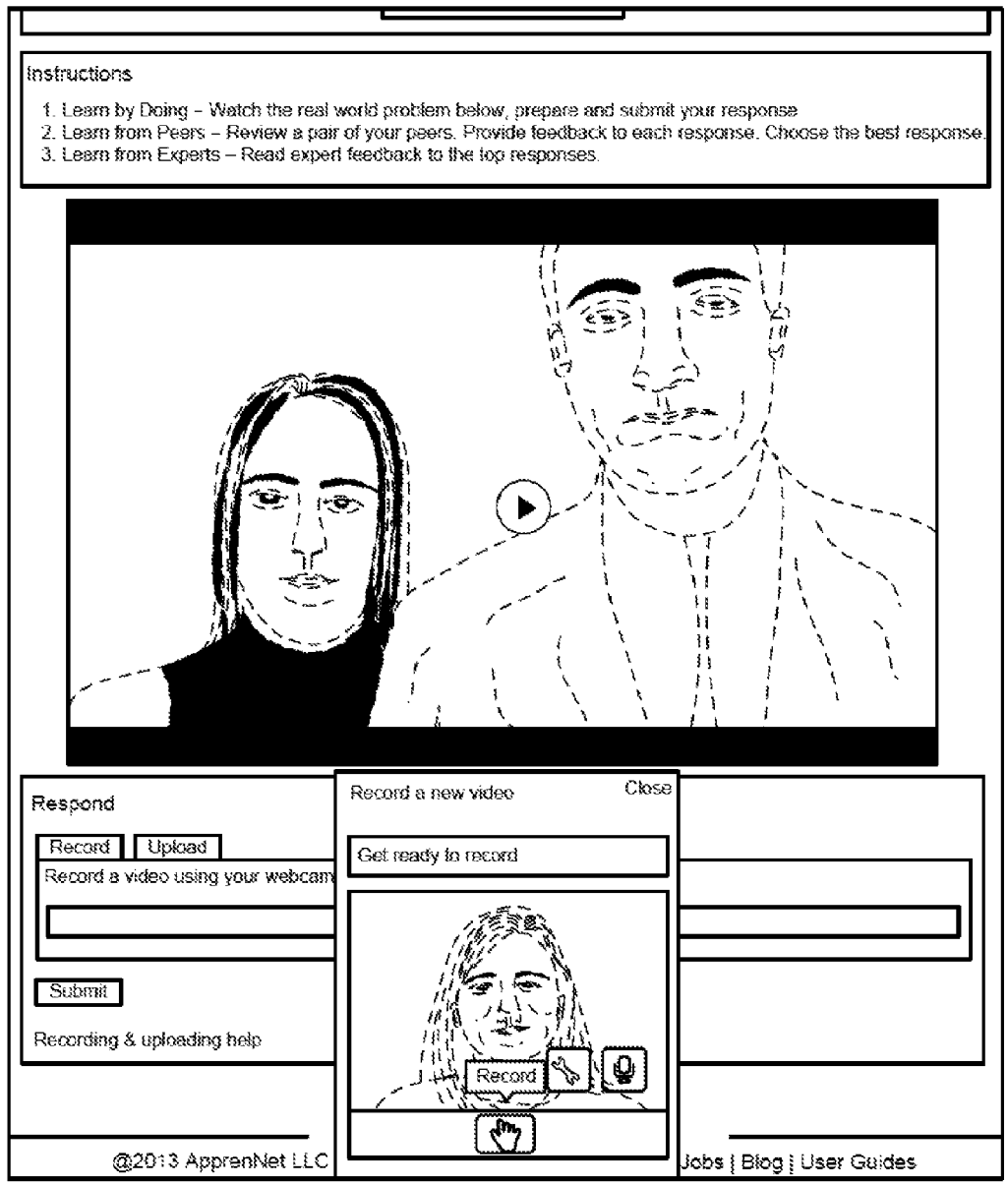
FIG. 11 is a screen shot of an exemplary web page of a website showing how a user may respond to an exercise challenge by posting a video file.

FIG. 4 illustrates an exemplary method by which a user accesses a Meet and submits a response. One or more users User$_1$ ... User$_n$ access the server through an Internet enabled device (step 17). The user obtains access through the novice interface. The user generates a query, for example for a challenge associated with an exercise, and the server receives this query (step 18). The database is searchable (by title, keyword, author, date of creation and other attributes) by users via an interface on the website. FIG. 10 shows an exemplary screen shot from the presently commercially embodied Meet website, which illustrates the server locating the requested file in the database and displaying the file on the user's Internet enabled device in a manner specified by the software (step 19). FIG. 11 shows another exemplary screen shot from the Meet website depicting the user generating a response, here in the form of a video file, and submitting this response to the server (step 20). Finally, the server catalogues and stores the responses from all users participating in the Meet in the database (step 21).

In one embodiment of the method illustrated in FIG. 4, the author of the Meet first provides the server with a list of qualified users, and the users receive an invitation to participate or the server provides links to all users that the users may use to access the server. Next, if the user is a first-time user, he or she visits the website, selects "create an account," provides information such as email, full name and a password and agrees to the "terms of use." If the user is a returning user, he or she visits the website, selects "login," and logs in to the website with a pre-set email and password. To join a group, the user follows a hyperlink provided by the author, selects "join the group," and returns to the group by selecting "groups" tab on the webpage. To participate in a Meet, the user clicks on the available Meet, selects "play" to view the challenge, prepares a response, records the response and saves the response. The challenge may be a video file, audio file or any other type of media file. The user-generated response may be a video file, audio file, or any other type of media file. If the user wishes to submit a response in the form of a video file, the user may record the response using a webcam, in which case the user selects the "record" tab, allows flash player, selects the square to begin recording, hits the red square to stop recording, previews and submits the video. The recording may also be done remotely, in which case the user submits the pre-recorded video by uploading a video file from the user Internet enabled device to the server. In an alternative embodiment, the user-generated response may be provided through a document collaboration tool that allows for drafting, conferencing or simulated questions and answers. Specifically, the conference feature may allow for negotiation or live interviewing between users. The question and answer feature allows users to ask questions of the fictional client prior to rendering the required performance Additionally, a query function may be provided which allows users to search a database of possible questions and answers associated with each exercise to provide an automated simulation of client interviewing.

Figure 5:
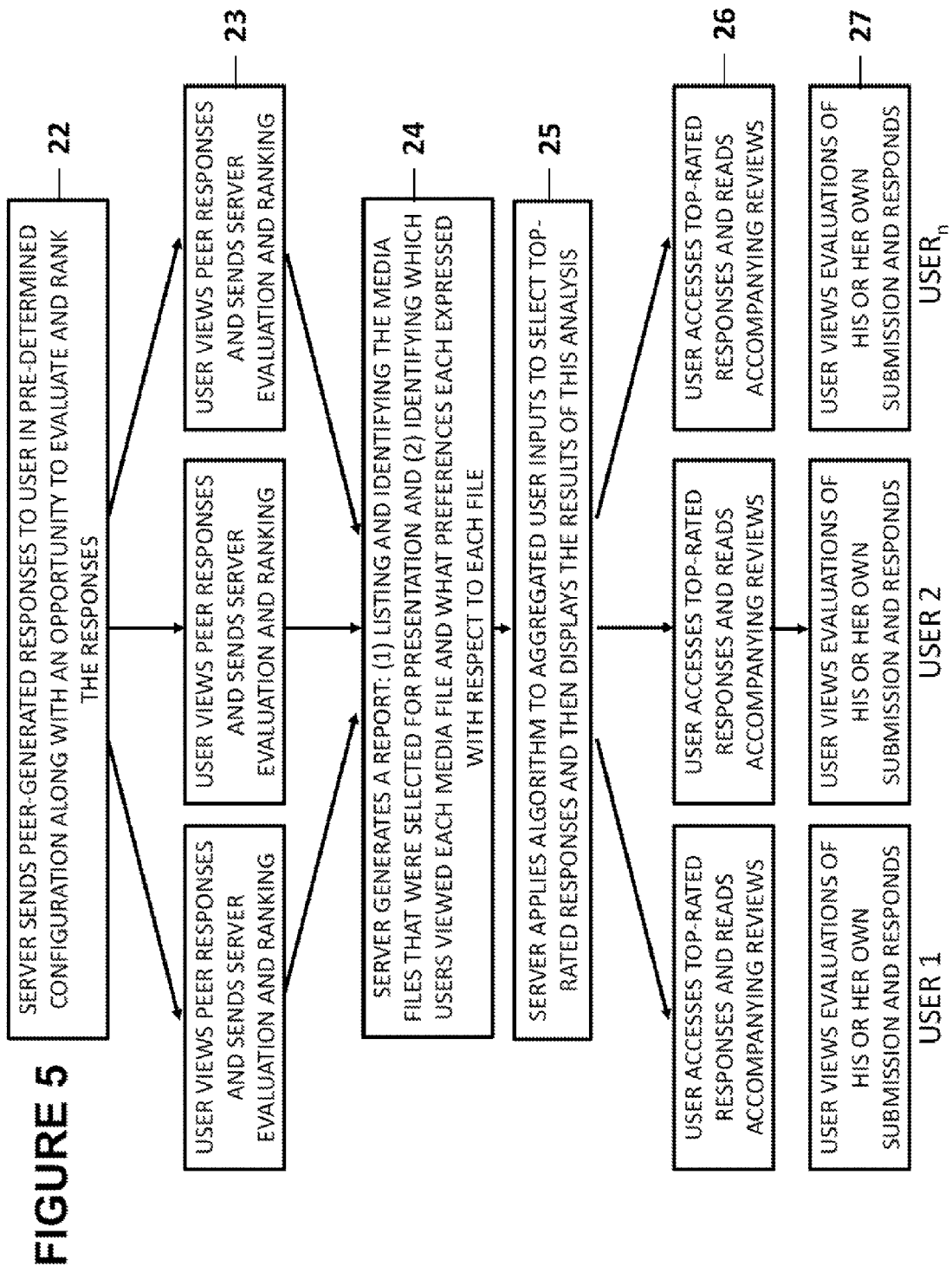
FIG. 5 illustrates an exemplary method by which users review peer responses and receive feedback.
Figure 12:
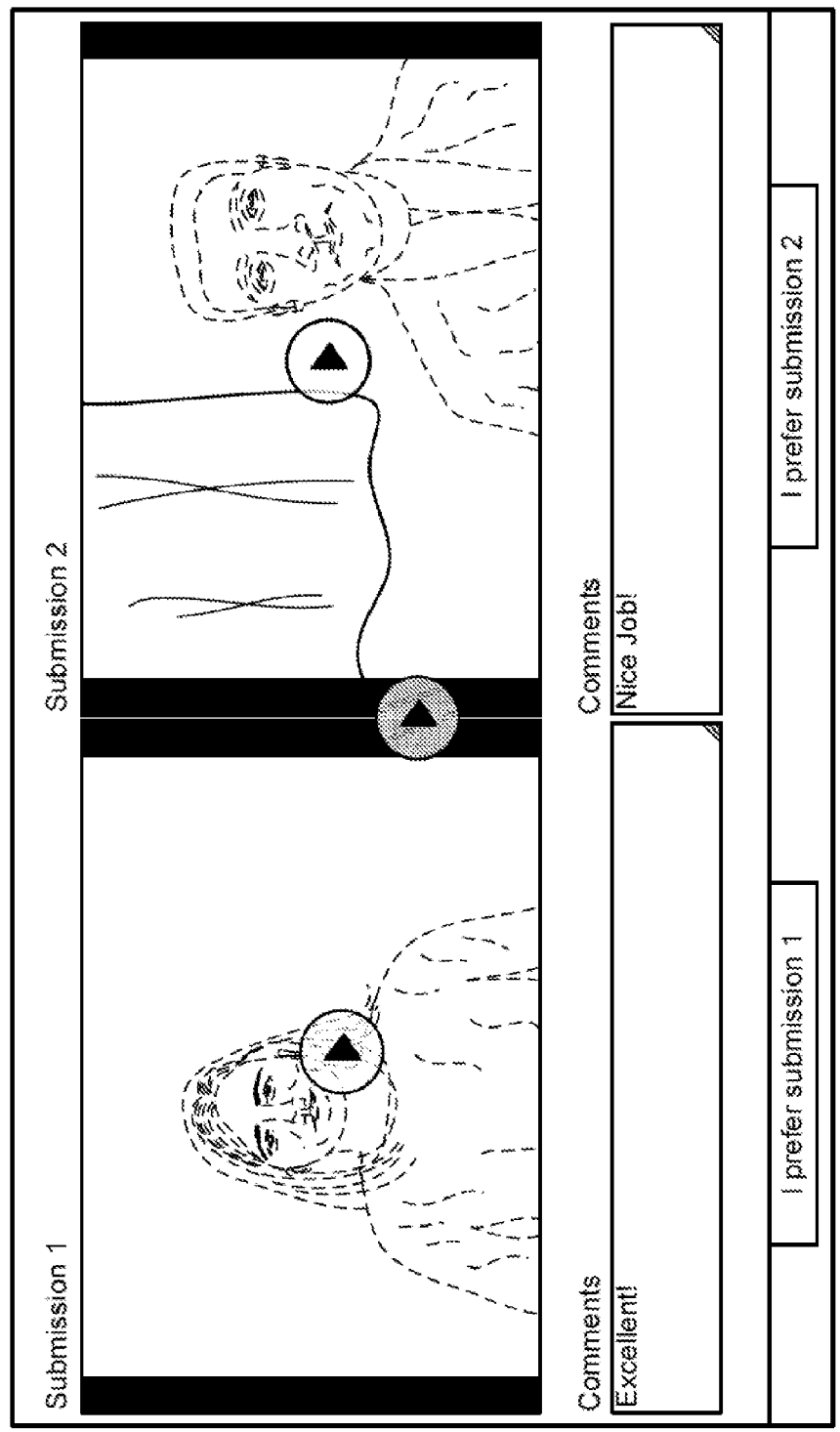
FIG. 12 is a screen shot of an exemplary web page of a website showing how a user may watch two peer responses, rank the responses and leave written feedback.

FIG. 5 illustrates an exemplary method by which users review peer responses and receive feedback. First, the server sends peer-generated responses that are associated with the exercise to the user in a pre-determined configuration, for example in pairs, and gives the user an opportunity to evaluate and rank the responses (step 22). This process is illustrated in FIG. 12, which displays an exemplary screen shot from the presently commercially implemented Meet website, in which a user views and responds to a pair of peer-generated video files. The media file may be viewed by the user using a media player or similar software service hosted on the server and accessed by the user via the Internet through the website. The ranking may be presented as a simple selection of a preferred recording, or it may be in the form of a rubric with multiple parameters. The user then views the peer responses and sends the server an evaluation, which may take the form of a written response and a ranking (step 23). Alternatively, the user response may take the form of a communication with one or more users. All of the user responses are aggregated, catalogued, and stored. The server then generates a report listing and identifying the media files that were selected for presented and identifying which users viewed each media file and what preferences each expressed with respect to each file (step 24). The reports generated by the server may be displayed to the users through the website in a variety of formats as specified by the software. The server then applies an algorithm to the aggregated user inputs of all the users participating in the Meet, selects top-rated responses, and, as depicted in the exemplary screen shot from the Meet website in FIG. 13, displays the top-rated responses in the form of a "leaderboard" on the website (step 25). The algorithms that may be applied on the server to generate a rank ordering of the media files can include: (1) algorithms to normalize numerical scores in order to make more comparable scores provided by different users, (2) algorithms that generate rank orderings across the entire sample of submissions based upon rank orderings of random subsamples, (3) algorithms that weight the impact of a given expressed preference based upon the prior preferences expressed with respect to a given media file (e.g. an ELO rating system), or (4) algorithms that weight preferences based upon variables that indicate the relative value of a given user's preference (e.g. measures of time on tasks, deviation of preferences from averages, deviation from established benchmarks, etc.). All users may access the top-rated responses and read the accompanying reviews (step 26). The user may also view the evaluations of his or her submission, read the evaluations and respond to those evaluations (step 27). In one embodiment, users may access the submissions and evaluations of all users participating in the exercise. Specifically, to review a Meet, the user finds and select the Meet, selects the "give and get feedback" tab and then selects "give feedback" under the "feedback period is open" heading, watches two submissions in their entirety, leaves comments, selects the preferred performance, and selects "review another pair" or "done" on the results page. To comment on the submissions without ranking the submissions, the user finds and selects the Meet, selects "view" under "view the submissions," selects view after each submitter's name, selects play to view the submission, leaves comments, and selects "submit" to save and publish the feedback.

Figure 6:
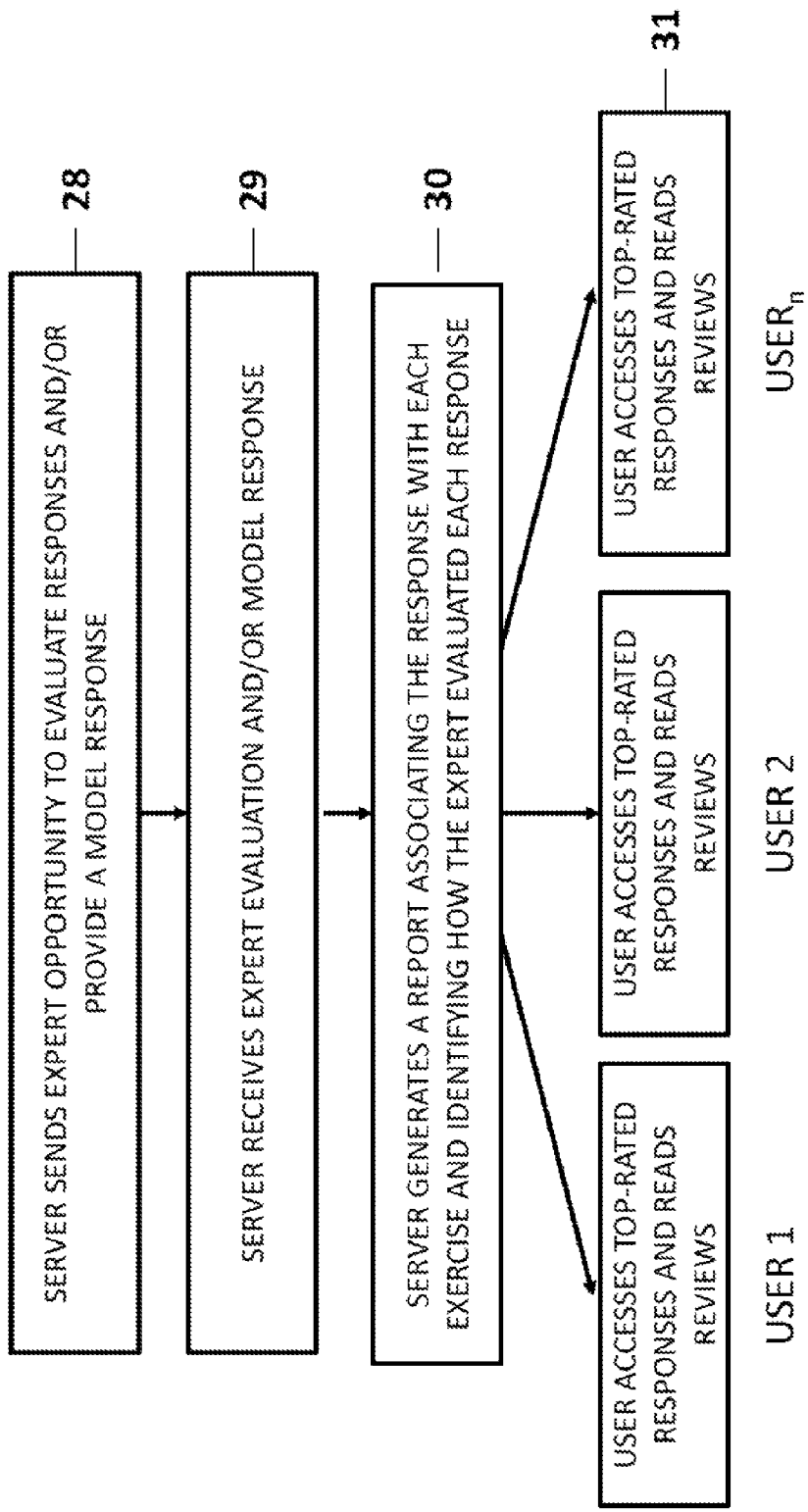
FIG. 6 illustrates an exemplary method by which an expert reviews and rates user responses.
Figure 15:
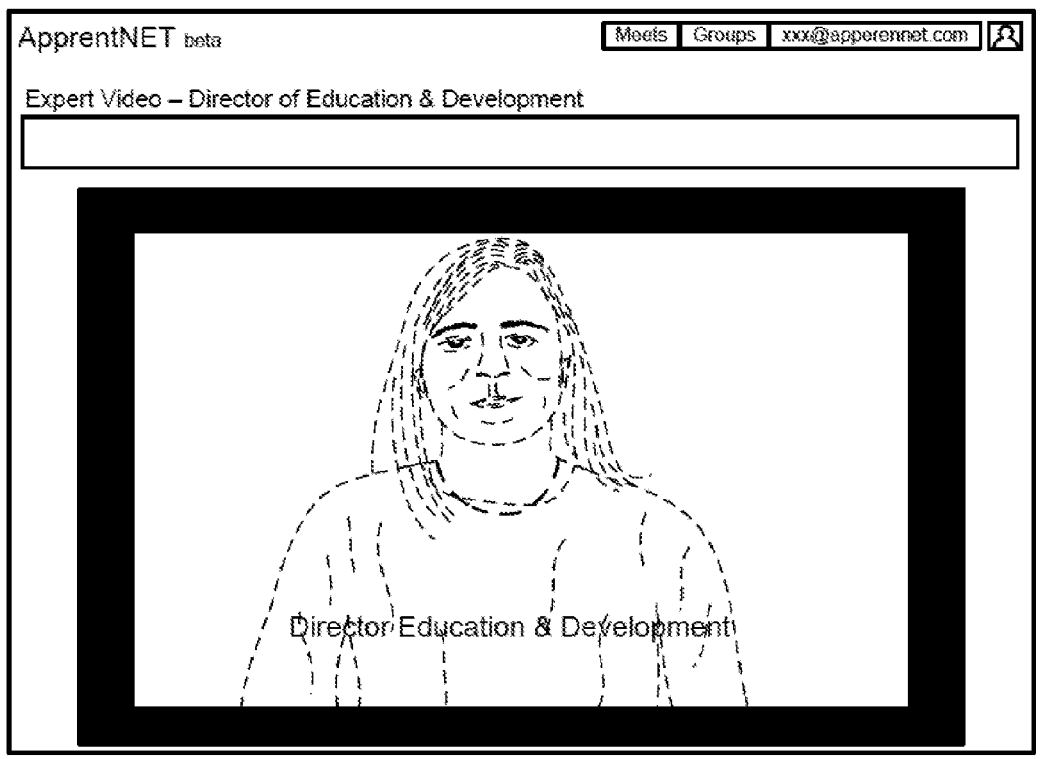
FIG. 15 is a screen shot of an exemplary web page of a website showing an expert-generated model response.

FIG. 6 illustrates an exemplary method by which an expert reviews and rates user responses. First, the server sends an expert the opportunity to evaluate a pre-determined number of responses and/or provide a model response (step 28). In one embodiment of the invention, the expert reviews only the top-rated responses. The expert accesses the server through the expert interface, then the expert generates a ranking, an evaluation and/or a model response and uploads this information to the server using video ingestion tools provided by the software (step 29). The evaluation may be in the form of a written document or video or audio files. An example of an expert-generated model response is depicted in FIG. 15 which shows a screen shot from the Meet website of an expert-generated video file. The server then generates a report that displays the expert's evaluation of each exercise (step 30). If the expert provides a ranking, the order of that ranking is published on the website as an "expert ranking" which may differ from the ranking on the "leaderboard." Ultimately, each user accesses the top-rated responses and reads the reviews (step 31). FIG. 14 shows an exemplary screen shot from the Meet website of a list of reviews for a top-rated submission. Specifically, the user may view the expert evaluations by finding and selecting the Meet, selecting "view" under "top reviewed submissions," selecting "view" after each submitter's name, and scrolling down the web page to read all the feedback. All users may access the top-rated responses and view the expert evaluations and/or model response. Experts may optionally be given a reputational reward to incentivize repeat performance where the expert earns points or some other form of currency for participating in the Meet.

Figure 7:
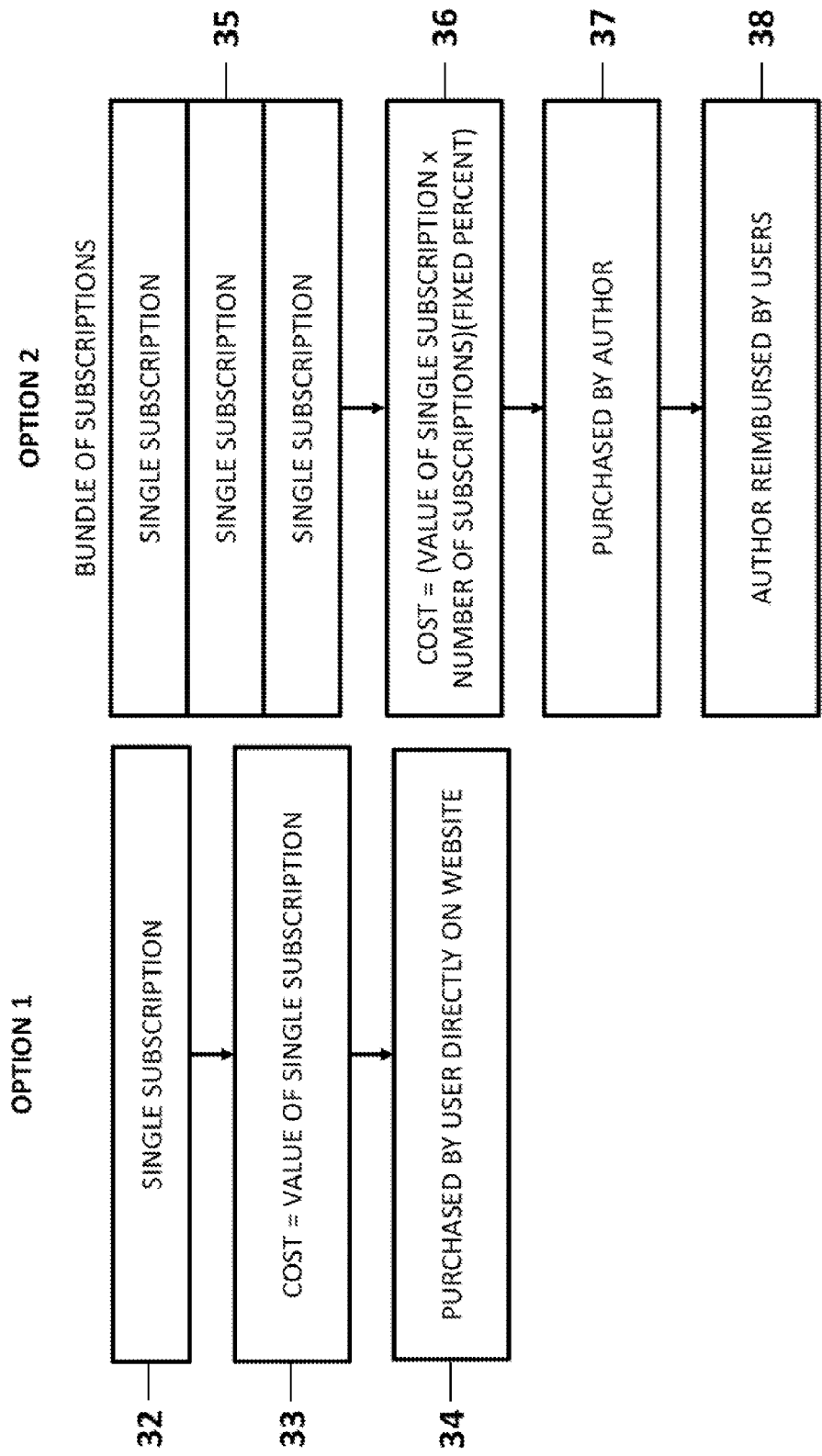
FIG. 7 illustrates an exemplary method for purchasing a subscription to the system.

FIG. 7 illustrates an exemplary method for purchasing a subscription to the system. Option 1 allows a user to purchase a single subscription 32 where the cost of that subscription is based on the market value for that subscription 33. This subscription may be purchased by the user directly on the website 34, for example with a credit card through a secure hyperlink. Option 2 allows an author 37 to purchase a bundle of subscriptions 35. The author determines the number of subscriptions in the bundle, and the cost to the author is the price of a single subscription times the number of subscriptions times a pre-determined percentage markup 36. This markup is a form of insurance for the seller in case fewer users buy subscriptions than anticipated and the author cancels some of the individual subscriptions in the bundle. The author is eventually reimbursed by the users 38.

Figure 8:
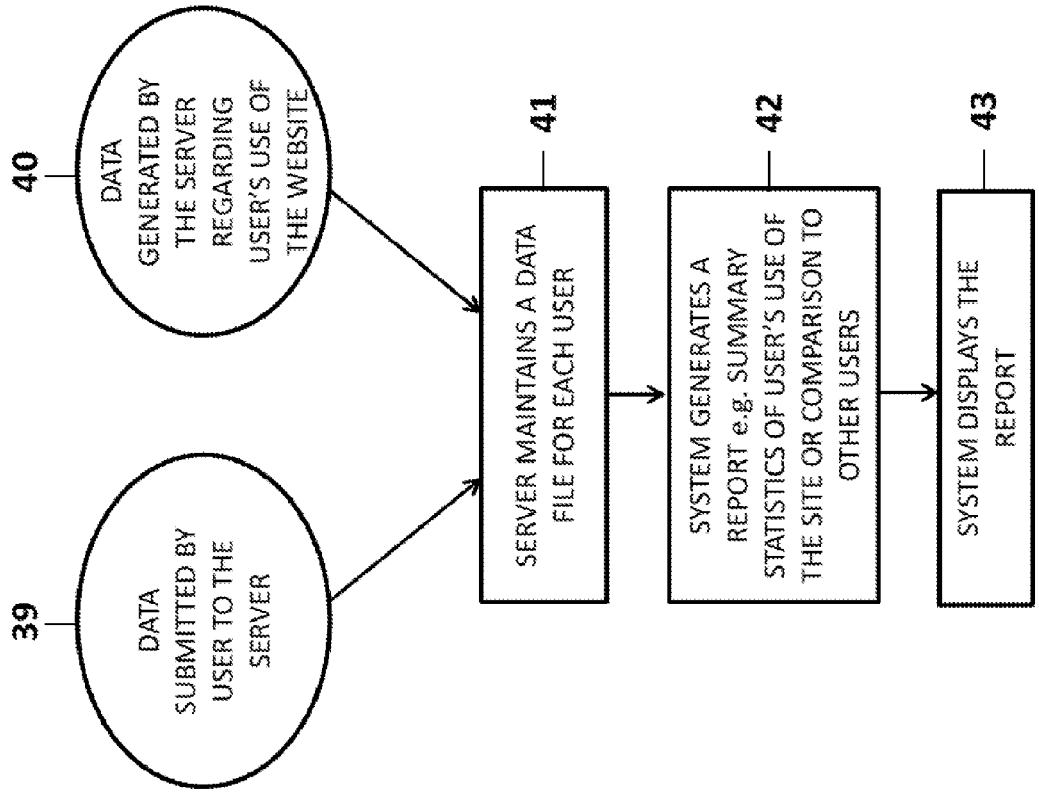
FIG. 8 illustrates an exemplary method for measuring the impact of participation on the achievement of the learning goals of the user.

FIG. 8 illustrates an exemplary method for measuring the impact of participation on the achievement of the learning goals of the user. Two types of data are collected by the server; data submitted by the user to the sever (39), and data generated by the server regarding the user's use of the website (40). The server maintains a data file in the database for each user that aggregates both types of data (41). The server then generates one or more reports using this data (42). These reports may include summary statistics regarding a user's participation on the website and comparisons or other relative rankings of various aspects of such user statistics with the statistics of other users. The system then creates and displays the reports in a variety of formats as specified by the software (43). The software may contain rules that restrict a user's access to features on the website, on the server or on the database based upon data in a user's data file.

In one embodiment, there is provided a system to collect data on novices' and experts' perceptions of the attributes of expertise. In the review process, reviewers may be asked to identify a single attribute justifying their assessment of the performance. Over time, large samples of these attribute identifications may be collected, allowing comparison of novice assessments with those of the experts, to correlate different groupings of assessments with various other variables and so on.

Figure 9:
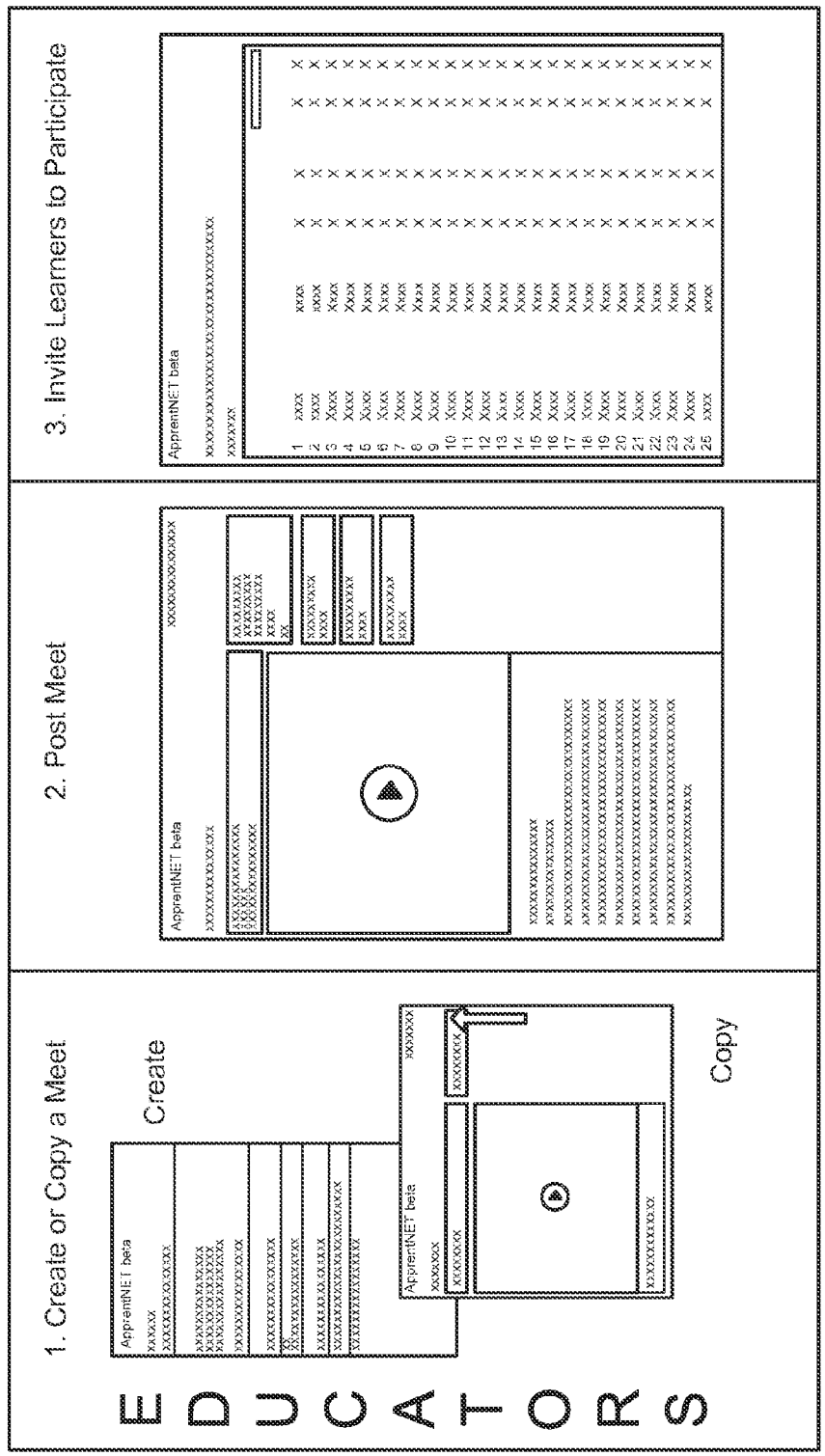
FIG. 9 shows multiple screen shots of exemplary web pages of a website which demonstrate the exercise authoring process.

FIG. 9 shows multiple screen shots of exemplary web pages of the presently commercially implemented Meet website, which demonstrate the Meet authoring process. Access to the web pages is obtained through the author interface. The author has the option to create or copy a pre-existing Meet, post that Meet and invite learners to participate. Various additional authoring tools may be provided in the form of a web-based template that allows authors to assemble a new exercise from a menu of preset components. The components may include problem presentation options (e.g. video, text, documents), performance options (using uploaded video, browser-based video capture, document uploads, browser-based document manipulations and video- or text-based conferencing), review and feedback options (including peer-to-peer voting, expert voting, text and video feedback and attribute collecting) and various gamification and badging strategies options (such as progress bars, on-line rewards and other "reputational" currencies).

To create a Meet, the author accesses the website and clicks "create a Meet," chooses a title, selects whether the Meet will be open or closed, creates a group, provides a short description of the group, uploads a video, provides Meet instructions, sets submission details (whether the challenges are standalone or whether the submission may build on past submissions), sets dates and times for the submission period to start and end, sets feedback details (who will give feedback, how the feedback will be given such as voting only or voting plus comments), includes "what to look for" points to guide the review process, sets review details (set time and end periods for the review period) and selects "create Meet" to publish on the website. To copy a Meet, the author finds and selects a Meet, selects "copy a Meet," and selects "customize a Meet." To invite users to join a group the author selects the groups tab, selects the relevant group, selects "manage this group," copies the hyperlink that is provided and emails it to all desired users. To create an expert round, the author selects the Meet, selects "create next round," enters a title for the Meet, finds and selects the group who participated in the original Meet, scrolls past the description and video assignment, enters any necessary instructions, decides whether to import top-ranked submissions from the first Meet immediately or sets the dates and times for when to import the submissions for the expert round, selects the link to indicate that experts will review the round, selects whether experts will vote and comment or just comment (if experts are voting), selects how many submissions will appear on the expert's leaderboard, decides whether to keep the original Meet objectives to help experts know what points they should look for during review, selects the date and time the review period will begin and end, selects "create Meet," and selects "manage reviewers" to send experts a link to review the Meet.

The foregoing method and system presents one preferred embodiment of the present invention. It should be appreciated that there are many alternative embodiments within the scope of the present invention. While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended.

What is claimed:

1. An electronic network-based method for enhancing the experience of a student user, through an interactive peer-to-peer learning and feedback exercise, by presenting an assignment to a plurality of peer student users, via the network, and for providing feedback to the student user's responses to the assignment, via the network, such that each student user receives peer student users' responses for feedback by such peer student users, such other student users defining a network-based community of peer student users with respect to the student user's response being evaluated, and such that an expert user receives student user responses for feedback by the expert, wherein the presentation of the assignment to the student users and the feedback from the peer student users and the expert user is conducted via internet enabled devices in communication with a server on the network employed by an author, the student user, peer student users, and the expert user, the server causing (a) a first user interface to be presented on the peer student users' internet enabled device for allowing the student user to watch and respond to the assignment and for peer student users to provide feedback, and (b) a second interface to be presented on the expert's internet enabled device for allowing the expert to provide feedback and/or generate a model response, the method comprising:

(i) receiving, at the server, from the student user, a user-generated search request for a first media file comprising at least one of an assignment, a challenge or instructional materials relating to the exercise;

(ii) performing, at the server, a search in response to the user-generated search request for the first media file, and presenting the first media file to the student user such that the student user is able to interact with the first media file via the first user interface;

(iii) receiving, at the server, from the student user, a second media file created in response to the student user interacting with the first media file, and cataloguing and depositing the second media file in a database, the database comprising plural second media files created by the student user and a plurality of peer student users who participated in the exercise;

(iv) selecting, at the server, ones of the second media files stored in the database created by at least two of the peer student users who participated in the exercise;

(v) presenting to the student user, at least a portion of the selected peer student users' second media files via the first user interface;

(vi) providing, at the server, an opportunity for the student user to provide feedback to the selected peer student users' second media files via the first user interface;

(vii) at the server, receiving the student users' feedback of the selected peer student users' second media files, aggregating feedback from the student user and peer student users participating in the exercise, and generating information indicative of a report that lists the second media files associated with the exercise;

(viii) processing the aggregated feedback, employing an algorithm based at least in part on the student user and peer student users' feedback, to generate and display a ranking of the second media files;

(ix) providing, at the server, an opportunity for the expert user to view the student users' second media files, to provide feedback, and to generate a model second media file via the second interface; and (x) providing, at the server, an opportunity for the student user and peer student users to view the expert's model response, the top-ranked second media files, and accompanying feedback.

2. The method of claim 1 wherein the server provides the expert user a single point of entry to the platform, via the second interface, and ingestion tools to develop a profile, record and present the expert user's demonstrations and feedback.

3. The method of claim 1 wherein access to the electronic network is based upon a subscription purchase and users gain access to the server through direct purchase of a subscription or by purchase of a portion of a bulk subscription by the author of the assignment.

4. The method of claim 1 wherein the server maintains, on the database, files and protocols for allowing users to create an account, log into the account, make payments and manage the account or any combination thereof.

5. The method of claim 1 wherein the author employs an author internet enabled device to generate the assignment via a web-based template residing on the server that includes a plurality of customizable options consisting of media presentation, media review, feedback, gamification and badging options.

6. The method of claim 1 wherein the author's first media file contains data indicative of one of a video, a written document, an audio file or any combination.

7. The method of claim 1 wherein the student, peer student user, and expert users' second media file contain data indicative of one of a video, a written document, an audio file or any combination.

8. The method of claim 1 wherein prior to receiving peer student user feedback, the second media file is processed through a document collaboration tool that allows for drafting, conferencing, question and answer sessions and queries.

9. The method of claim 1 wherein the second media files are presented to the student and peer student users' for feedback singly, in pairs or in other configurations as previously determined by the software.

10. The method of claim 1 wherein the opportunity to provide feedback on the second media files is presented in the form of a ranking that indicates the student, peer student and expert user's relative assessment of the second media files, as a responsive comment, and/or as some other form of communication.

11. The method of claim 1 wherein the student and peer student user may view, on an internet enabled device, the feedback of his or her own second media file and provide responsive comments.

12. A computer readable storage medium comprising computer readable executable instructions to be carried out by an internet enabled device for presenting an assignment to a plurality of peer student users, via the network, and for providing feedback to the student users' responses to the assignment, via the network, such that each student user receives peer student users' responses for feedback by such peer student users, such other student users defining a network based community of peer student users with respect to the student user's response being evaluated, and such that an expert user receives student user responses for feedback by the expert, wherein the presentation of the assignment to the student users and the feedback from the peer student users and the expert is conducted via internet enabled devices in communication with a server on the network employed by an author, student user, peer student users, and the expert user, the server causing (a) a first user interface to be presented on the peer student users' internet enabled device for allowing the student user to watch and respond to the assignment and for peer student users to provide feedback, and (b) a second interface to be presented on the expert's internet enabled device for allowing the expert to provide feedback and/or generate a model response, the instructions, when executed, enhance the experience of a student user, by directing student, peer student, and expert users through an interactive network-based learning and feedback assignment by:

(i) receiving, at the server, from the student users, a user-generated search request for a first media file comprising at least one of an assignment, a challenge or instructional materials relating to the exercise;

(ii) performing, at the server, a search in response to the user-generated search request for the first media file, and presenting the first media file to the student user such that the student user is able to interact with the first media file via the first user interface;

(iii) receiving, at the server, from the student user, a second media file created in response to the student user interacting with the first media file, and cataloguing and depositing the second media file in a database, the database comprising plural second media files created by the student user and a plurality of peer student users who participated in the exercise;

(iv) selecting, at the server, ones of the second media files stored in the database created by at least two of the other peer student users who participated in the exercise;

(v) presenting to the student user, at least a portion of the selected peer student users' second media files via the first user interface;

(vi) providing, at the server, an opportunity for the student user to provide feedback to the selected peer student users' second media files via the first user interface;

(vii) at the server, receiving the student users' feedback of the selected peer student users' second media files, aggregating feedback from the student and peer student users participating in the exercise, and generating information indicative of a report that lists the second media files associated with the exercise;

(viii) processing the aggregated feedback, employing an algorithm based at least in part on the student and peer student users' feedback, to generate and display a ranking of the second media files;

(ix) providing, at the server, an opportunity for the expert user to view the student users' second media files, to provide feedback, and to generate a model second media file via the second interface; and (x) providing, at the server, an opportunity for the student and peer student users to view the expert's model response, the top-ranked second media files, and accompanying feedback.

13. The storage medium of claim 12 further comprising executable instructions that cause the server to provide the expert user with a single point of entry to the platform, via the second interface, and ingestion tools to develop a profile, record and present the expert user's demonstrations and feedback.

14. The storage medium of claim 12 wherein access to the electronic network is based upon a subscription purchase and users gain access to the server through direct purchase of a subscription or by purchase of a portion of a bulk subscription by the author of the assignment.

15. The storage medium of claim 12 wherein the server maintains, on the database, files and protocols for allowing users to create an account, log into the account, make payments and manage the account or any combination thereof.

16. The storage medium of claim 12 further comprising executable instructions that cause the server to display on an author internet enabled device an opportunity to generate the assignment by employing a web-based template residing on the server that includes a plurality of customizable options comprising media presentation, media review, feedback, gamification and badging options.

17. The storage medium of claim 12 wherein the author's first media file contains data indicative of one of a video, a written document, an audio file or any combination.

18. The storage medium of claim 12 wherein the student, peer student user, and expert users' second media file contains data indicative of one of a video, a written document, an audio file or any combination.

19. The storage medium of claim 12 wherein prior to receiving peer student user feedback, the second media file is processed through a document collaboration tool that allows for drafting, conferencing, question and answer sessions and queries.

20. The storage medium of claim 12 wherein the second media files are presented to the student and peer student users' for feedback singly, in pairs or in other configurations as previously determined by the software.

21. The storage medium of claim 12 wherein the opportunity to provide feedback on the second media files is presented in the form of a ranking that indicates the student, peer student and expert user's relative assessment of the second media files, as a responsive comment, and/or as some other form of communication.

22. The storage medium of claim 12 wherein the student and peer student user may view, on an internet enabled device, the feedback of his or her own second media file and provide responsive comments.

23. A system comprising (a) an internet enabled user device capable of communicating with a server on the network, and (b) computer instructions executable by the user device for enhancing the experience of a student user, through an interactive network-based peer-to-peer learning and feedback assignment, by presenting an assignment to a plurality of peer student users, via the network, and for providing feedback to the student users' responses to the assignment, via the network, such that each student user receives peer student users' responses for feedback by such peer student users, such other student users defining a network based community of peer student users with respect to the student user's response being evaluated, and such that an expert user receives student user responses for feedback by the expert, wherein the presentation of the assignment to the student users and the feedback from the peer student users and the expert is conducted via internet enabled devices in communication with a server on the network employed by an author, student user, peer student users, and expert user, the server causing (a) a first user interface to be presented on the peer student users' internet enabled device for allowing the student user to watch and respond to the assignment and for peer student users to provide feedback, and (b) a second interface to be presented on the expert's internet enabled device for allowing the expert to provide feedback and/or generate a model response, the instructions, when executed by the server, programmed to:

(i) receive, at the server, from the student users, a user-generated search request for a first media file comprising at least one of an assignment, a challenge or instructional materials relating to the exercise;

(ii) perform, at the server, a search in response to the user-generated search request for the first media file, and present the first media file to the student user such that the student user is able to interact with the first media file via the first user interface;

(iii) receive, at the server, from the student user, a second media file created in response to the student user interacting with the first media file, and catalogue and deposit the second media file in a database, the database comprising plural second media files created by the student user and a plurality of other peer student users who participated in the exercise;

(iv) select, at the server, ones of the second media files stored in the database created by at least two of the other peer student users who participated in the exercise;

(v) present to the student user, at least a portion of the selected peer student users' second media files via the first user interface;

(vi) provide, at the server, an opportunity for the student user to provide feedback to the selected peer student users' second media files via the first user interface;

(vii) at the server, receive the student users' feedback of the selected peer student users' second media files, aggregate feedback from the student and peer student users participating in the exercise, and generate information indicative of a report that lists the second media files associated with the exercise;

(viii) process the aggregated feedback, employing an algorithm based at least in part on the student and peer student users' feedback, to generate and display a ranking of the second media files;

(ix) provide, at the server, an opportunity for the expert user to view the student users' second media files, to provide feedback, and to generate a model second media file via the second interface; and (x) provide, at the server, an opportunity for the student and peer student users to view the expert's model response, the top-ranked second media files, and accompanying feedback.

24. The system of claim 23 wherein the server is further programmed to cause to provide the expert user with a single point of entry to the platform, via the second interface, and ingestion tools to develop a profile, record and present the expert user's demonstrations and feedback.

25. The system of claim 23 wherein access to the electronic network is based upon a subscription purchase and users gain access to the server through direct purchase of a subscription or by purchase of a portion of a bulk subscription by the author of the assignment.

26. The system of claim 23 wherein the server maintains, on the database, files and protocols for allowing users to create an account, log into the account, make payments and manage the account or any combination thereof.

27. The system of claim 23 wherein the server is further programmed to display on an author internet enabled device an opportunity to generate the assignment by employing a web-based template residing on the server that includes a plurality of customizable options comprising media presentation, media review, feedback, gamification and badging options.

28. The system of claim 23 wherein the author's first media file contains data indicative of one of a video, a written document, an audio file or any combination.

29. The system of claim 23 wherein the student, peer student user, and expert users' second media file contains data indicative of one of a video, a written document, an audio file or any combination.

30. The system of claim 23 wherein prior to receiving peer student user feedback, the second media file is processed through a document collaboration tool that allows for drafting, conferencing, question and answer sessions and queries.

31. The system of claim 23 wherein the second media files are presented to the student and peer student users' for feedback singly, in pairs or in other configurations as previously determined by the software.

32. The system of claim 23 wherein the opportunity to provide feedback on the second media files is presented in the form of a ranking that indicates the student, peer student and expert user's relative assessment of the second media files, as a responsive comment, and/or as some other form of communication.

33. The system of claim 23 wherein the student and peer student user may view, on an internet enabled device, the feedback of his or her own second media file and provide responsive comments.

* * * * *